United States Patent [19]

Palmer

[11] Patent Number: 4,834,472

[45] Date of Patent: May 30, 1989

[54] OPTICAL BEAM EXPANDERS WITH MATERIALS CHOSEN TO EFFECT ATHERMALIZATION

[75] Inventor: John M. Palmer, Clwyd, Wales

[73] Assignee: Pilkington P.E. Limited, United Kingdom

[21] Appl. No.: 27,007

[22] Filed: Mar. 17, 1987

[30] Foreign Application Priority Data

Apr. 3, 1986 [GB] United Kingdom ................. 8608130

[51] Int. Cl.⁴ ..................... G02B 13/14; G02B 3/00; G02B 9/10
[52] U.S. Cl. .................................. 350/1.4; 350/453; 350/481
[58] Field of Search .................. 350/1.2, 1.4, 481, 453

[56] References Cited

U.S. PATENT DOCUMENTS

| | | | |
|---|---|---|---|
| 2,453,218 | 11/1948 | Grey | 350/481 |
| 3,817,604 | 6/1974 | Watt | 350/457 |
| 4,469,396 | 9/1984 | Neil | 350/1.3 |
| 4,475,793 | 10/1984 | Ford | 350/172 |
| 4,632,520 | 12/1986 | Yamakawa | 350/446 |

FOREIGN PATENT DOCUMENTS

| | | |
|---|---|---|
| 0096193 | 12/1983 | European Pat. Off. . |
| 561503 | 5/1944 | United Kingdom . |
| 1530066 | 10/1978 | United Kingdom . |
| 1559514 | 1/1980 | United Kingdom . |
| 2071353 | 9/1981 | United Kingdom . |
| 2121211 | 12/1983 | United Kingdom . |
| 2138591 | 10/1984 | United Kingdom . |
| 2161616 | 1/1986 | United Kingdom . |

OTHER PUBLICATIONS

Refracting Afocal Systems in Thermal Imagers, *Optical Engineering*, Thomas H. Jamieson, vol. 19, No. 6 Nov./Dec. 1980, pp. 883-893.

*Primary Examiner*—John K. Corbin
*Assistant Examiner*—David J. Edmondson
*Attorney, Agent, or Firm*—F. Eugene Davis, IV

[57] ABSTRACT

An optical substantially afocal beam expander has a negative lens element spaced from a positive lens element. The lens elements are of different materials with respective coefficients of refractive index change with respect to temperature such that the effect of a temperature change on one element is at least partially compensated by the effect of the temperature change on the other element. The beam expander is therefore substantially athermalised with respect to afocality.

13 Claims, 1 Drawing Sheet

OPTICAL BEAM EXPANDERS WITH MATERIALS CHOSEN TO EFFECT ATHERMALIZATION

BACKGROUND OF THE INVENTION

This invention concerns improvements in or relating to optical beam expanders.

Some optical systems require optical beam expansion such that the diameter of a beam of electromagnetic radiation is effectively increased. Frequently the beam is the output of a laser system. Gains which can be achieved by beam expansion are that the beam divergence is reduced by the magnification ratio and that the beam flux per unit area is similarly reduced. An example of a beam expansion system is disclosed in U.S. Pat. No. 4,475,793. That system includes a basically known form of afocal refractive beam expander consisting of a negatively powered lens element air spaced by a fixed distance from a positively powered lens element and arranged so that the negative element diverges a narrow substantially parallel sided beam and the positive element returns the beam to substantially parallelism but at an increased diameter. If such a beam expander has lens elements of a material whose refractive index varies substantially with temperature, then the device is correspondingly temperature sensitive. As a particular example, if the refracting lens elements are made of germanium, which is commonly used for infra-red wavelengths but has a relatively large rate of change of refractive index with respect to temperature, then the beam expander while satisfactorily operative to effect a required afocal beam expansion at one temperature will not have the same effect at a different temperature and afocality will be lost. The change of refractive index with temperature can be compensated by modifying the central air space between the lens elements in step with the temperature change, but this introduces the generally undesirable requirement of movable parts with consequential complication.

SUMMARY OF THE INVENTION

The present invention broadly provides an optical substantially afocal beam expander having spaced negative and positive lens components employing different materials having respective refractive index changes with respect to temperature such that the effect of a temperature change on one component is at least partially compensated by the effect of the temperature change on the other component whereby the beam expander is substantially athermalised with respect to afocality.

More particularly according to the present invention there is provided an optical substantially afocal beam expander comprising a lens element of negative power of a first material spaced from a lens element of positive power of a second material different from the first, in which the respective coefficients of refractive index change with respect to temperature of the first and second materials are related in a manner such that the beam expander is substantially athermalised with respect to afocality. With an afocal expander the ratio of the powers of the two elements determines the magnification and the ratio of the coefficients of refractive index change with respect to temperature required to maintain afocality with temperature change can also be determined from that power ratio, i.e. is related to the magnification. If the beam expander is to be used with a substantially monochromatic beam, the magnification and the refractive index coefficients of the two materials preferably substantially satisfy (at a design temperature) the relationship:

$$\frac{(y2)}{(y1)} = \frac{\frac{(dn)}{(dT)1}}{\frac{(dn)}{(dT)2}} \cdot \frac{(n2-1)}{(n1-1)}$$

where $(y2)/(y1)$ is the magnification at the design temperature, $(dn)/(dT)1$ is the rate of change of refractive index with respect to temperature of said first material, $(dn)/(dT)2$ is the rate of change of refractive index with respect to temperature of said second material, $n1$ is the refractive index of said first material at the design temperature and at the effective operating wavelength, $n2$ is the refractive index of said second material at the design temperature and at the effective operating wavelength.

If the beam expander is to be used with a polychromatic beam then the magnification and the constringences of the two materials preferably additionally substantially satisfy (at the design temperature) the relationship:

$$\frac{(y2)}{(y1)} = \frac{V2}{V1}$$

where $V1$ is the constringence of said first material, $V2$ is the constringence of said second material.

In the beam expander said lens element of negative power may be a back element of meniscus shape convex to the rear, and said lens element of positive power may be a front element of meniscus shape convex to the front or convex to the rear.

The beam expander may be designed for operation with infra-red radiation, the materials of the lens components or elements then being infra-red transmitting materials, i.e. materials having a useful spectral bandpass to radiation of the operative infra-red wavelength or wavelengths. The materials may, for example, be transmissive to thermal infra-red radiation in which case the constringence value 'V' is generally given by:

$$V = \frac{n10 - 1}{n8 - n12}$$

where $n10$ is the refractive index at 10 microns wavelength $n8$ is the refractive index at 8 microns wavelength $n12$ is the refractive index at 12 microns wavelength.

For an effective operating wavelength of about 10 microns said first and second materials may, for example, be germanium and zinc selenide respectively.

BRIEF DESCRIPTION OF THE DRAWINGS

In order that the invention may be better understood, embodiments thereof will now be described, by way of example, with reference to the accompanying drawings, in which.

DESCRIPTION OF THE PREFERRED EMBODIMENTS

Figure 1:
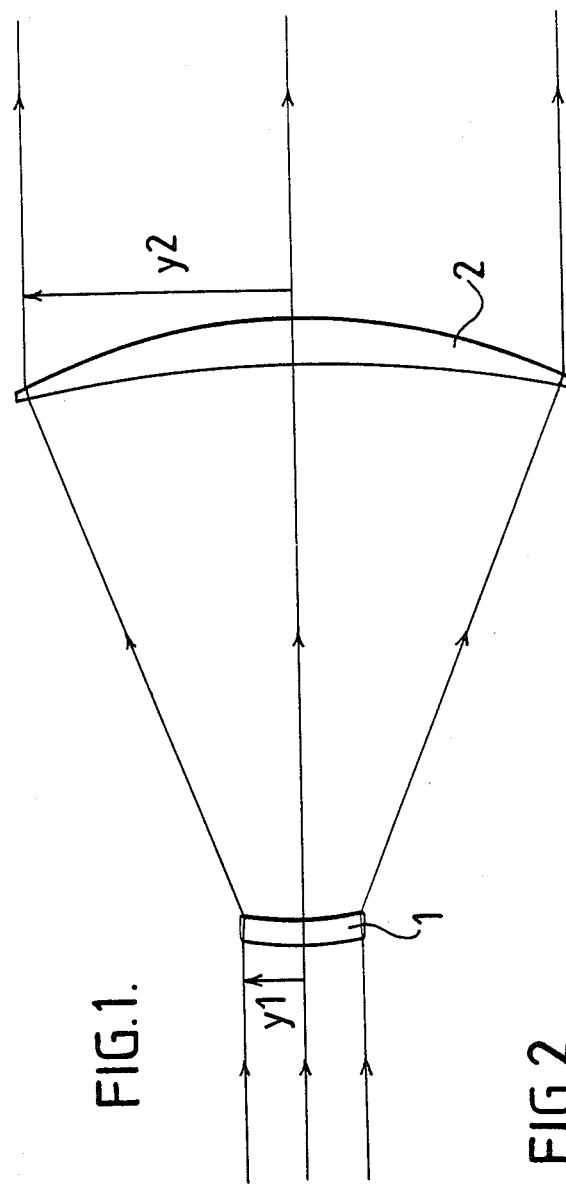
FIG. 1 is a schematic representation of a first embodiment of substantially afocal beam expander.

The beam expander of FIG. 1 consists of a rear singlet lens element 1 of negative power spaced from a front singlet lens element 2 of positive power as in a Galilean telescope.

The negative rear lens element 1 causes divergence of an incident parallel sided beam and the positive front lens element 2 returns the beam to parallel sided form but at an increased diameter relative to the incident beam. In other words the lens elements 1 and 2 have a common focal point (which is virtual so that undesirable energy concentration with a high energy laser beam is avoided). Thus a narrow incident beam, usually from a laser, is expanded to a relatively broad emergent beam. The extent of the expansion, i.e. the magnification, is the ratio of the diameters of the incident and outgoing beams, or, expressed otherwise, the ratio of the image ray height 'y2' at the positive lens element to the image ray height 'y1' at the negative lens element. The lens elements 1 and 2 are mounted in a suitable housing or cell (not shown).

The magnification of the afocal beam expander is equal to the ratio of the focal lengths of the individual lens elements 1 and 2. Each focal length is approximately inversely proportional to the term '(n−1)', where 'n' is the refractive index of the material of the respective lens element. In accordance with the invention then, if the two lens elements are made of different materials, substantial athermalisation for afocality can be achieved if the ratio of the powers determining the magnification (power being the reciprocal of focal length) also determine the required ratio of the coefficients of change of refractive index with respect to temperature of the two materials, i.e. if materials having coefficients whose ratio accords with the given power ratio (and hence magnification) are chosen, or conversely if a magnification and power ratio are selected to accord with the ratio of coefficients of suitable available materials.

Expressed in more mathematical terms, passive optical athermalisation requires three conditions to be satisfied:

(1) The total power of the lens system $$K_T = \sum_{i=1}^{M} K_i Y_i$$

(2) The chromatic correction of the lens system $$\Delta K_{CHR} = \sum_{i=1}^{M} \frac{K_i Y_i^2}{V_i}$$

(3) The thermal focus shift of the lens system $$\Delta K_{TH} = \sum_{i=1}^{M} \frac{K_i}{(n_i - 1)} \cdot \frac{(dn)}{(dt)_i} \cdot Y_i^2$$

where:
K = individual lens power = 1/focal length
y = image ray height at lens
v = lens material constringence
n = lens material refractive index
(dn)/(dt) = lens material rate of change of refractive index with respect to temperature.

$\Delta K_{CHR}$ and $\Delta K_{TH}$ are each generally zero and for an afocal system $K_T$ is also zero since the full system has no focussing action and therefore no overall power. Hence:

$$K_T = \Delta K_{CHR} = \Delta K_{TH} = 0$$

For an afocal beam expander as shown in the drawing having the two single lens elements 1 and 2 of different materials (to which the corresponding subscripts apply), the following relationships can be derived from the above given three conditions:

(A) Magnification =

$$\frac{\frac{(dn)}{(dT)_1}}{\frac{(dn)}{(dT)_2}} \cdot \frac{(n_2 - 1)}{(n_1 - 1)}$$

(B) Magnification = V2/V1 and by definition:
(C) Magnification = y2/y1

Athermalisation with respect to afocality can therefore be achieved by satisfying these relationships. However, these cover the general case allowing for chromatic dispersion. Relationship (B) is applicable with a polychromatic beam, but if the beam to be expanded is of effectively monochromatic radiation, for example from a laser source, there is no need to limit the choice of materials to their chromatic dispersions, and compliance with relationship (B) therefore becomes unnecessary. For a monochromatic beam then, athermalisation can be achieved if the relationship between the magnification and the refractive index coefficients of the two materials satisfies (A), i.e.:

$$\frac{(y_2)}{(y_1)} = \frac{\frac{(dn)}{(dT)_1}}{\frac{(dn)}{(dT)_2}} \cdot \frac{(n_2 - 1)}{(n_1 - 1)}$$

It will be appreciated that, since refractive index changes with temperature, this applies at a design temperature, usually about 20° C.

It will be further appreciated that precise compliance with the relationship is not generally necessary in practice and approximate compliance such as to effect substantial athermalisation with respect to afocality to the extent required in the particular system in which the beam expander is employed will usually suffice. Also, there may in practice have to be some compromise from the ideal having regard to the availability of suitable materials, and hence of coefficients of refractive index change with respect to temperature, to give required ratios, and to the permissible extent of variance from a preferred magnification in a particular system.

These practical limitations may necessitate some departure from total perfect athermalisation which maintains absolute afocality, but a compromise which provides a substantial degree of athermalisation to maintain adequate afocality over a reasonable temperature range will usually be satisfactory. Also, in some systems precise afocality may not be required of the beam expander and a beam expander which is nearly but not exactly afocal is still considered to be substantially afocal. Thus a beam expander is considered to be substantially athermalised with respect to afocality when there is some useful effect towards maintaining substantial afocality with change of temperature.

A particular example of afocal beam expander for use with a laser beam of 10.6 microns wavelength has numerical data as follows. It is of the form shown in FIG. 1 with a negative back element 1 of meniscus shape convex to the rear and a positive front element 2 of meniscus shape convex to the front. The refracting surfaces, indicated from the back to the front as R1 to R4, are all of spherical curvature, and the dimensional units are millimeters (but the values are relative and can be scaled accordingly).

EXAMPLE I

| Surface | Radius of Curvature | Axial Thickness/ Separation | Clear Aperture Diameter |
|---|---|---|---|
| R1 | 80.828 | | 20.015 |
| | | 3.81 | |
| R2 | 40.319 | | 19.203 |
| | | 90.17 | |
| R3 | −201.739 | | 87.867 |
| | | 7.62 | |
| R4 | −95.476 | | 88.770 |

This example of expander provides a magnification of 4.3 at 20° C., the focal length of the negative element 1 being −28.985 and the focal length of the positive element 2 being 125.000. The negative element 1 is of Germanium and the positive element 2 is of zinc selenide, these materials having refractive index 'n' and constringence 'V' values at 20° C., and coefficients of change of refractive index with respect to temperature (dn/dT) values as follows:

| | 'n' | 'V' | dn/dT(°C.$^{-1}$) |
|---|---|---|---|
| Ge | 4.00324 | 868.0 | 0.000396 |
| ZnSe | 2.40655 | 57.9 | 0.00006 |

The design of this example is diffraction limited for a 20 mm diameter entrance beam. The lens elements are air spaced and ideally this space should have zero or slightly negative expansion with temperature increase. In practice this is effectively achieved by having a low expansion lens cell material for the mount. With the above example employing germanium and zinc selenide the magnification value calculated from relationship (A) above works out at about 3.1 as against the actual magnification of 4.3, i.e. a departure of about +30%. However this extent of athermalisation with respect to afocality is sufficient for the requirements of the system in which this example of beam expander is to be used and enables the example to be diffraction limited over a range of temperature variation of about ±36° C., whereas a corresponding beam expander with both elements of germanium would be diffraction limited over a temperature variation range of only about ±4° C. With other embodiments and examples the departure from the theoretical value according to relationship (A) may be more, for example 50%, or less (and/or of opposite sign) than with the present example in order to effect substantial athermalisation, i.e. athermalisation to an extent which maintains substantial afocality sufficiently closely with variation of temperature to meet the requirements of the system in which the expander is used.

Figure 2:
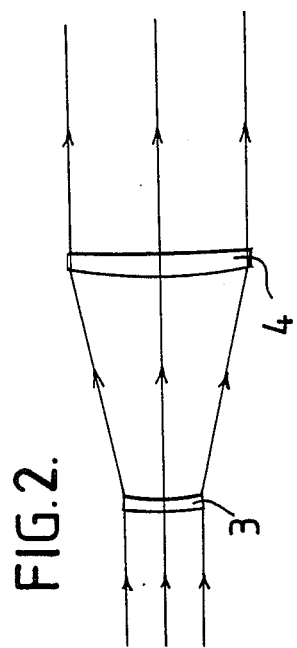
FIG. 2 is a schematic representation of a second embodiment of substantially afocal beam expander drawn to a different scale.

Another embodiment of substantially afocal beam expander is schematically shown in FIG. 2. It has a negatively powered back element 3 of meniscus shape convex to the rear and a positively powered front element 4 of meniscus shape also convex to the rear.

An example in accordance with the FIG. 2 embodiment having a germanium negative back element 3 air spaced from a zinc selenide positive front element 4 has numerical values as follows, the refracting surfaces again being all of spherical curvature and indicated from the back to the front as R1 to R4, and the dimensional units being millimeters (but scaleable).

EXAMPLE II

| Surface | Radius of Curvature | Axial Thickness/ Separation | Clear Aperture Diameter |
|---|---|---|---|
| R1 | −330.342 | | 30.000 |
| | | 3.750 | |
| R2 | −75.958 | | 30.137 |
| | | 36.831 | |
| R3 | −34.480 | | 12.682 |
| | | 2.000 | |
| R4 | −58.209 | | 13.059 |

This example of expander provides a magnification of 2.2 at 20° C., i.e. a departure of about −30% from the calculated 3.1 value given by relationship (A) for germanium and zinc selenide.

In Example II the negative element 3 has a focal length of −30.07 and the positive element 4 has a focal length of 69.72. The example is not precisely afocal and the separation between the lens elements, i.e. the axial spacing of surfaces R2 and R3, would need to be set to 40.88 to render it paraxially afocal. This example also has some residual aberration to balance aberration in the rest of the optical system in which it is used. To balance the aberration within the beam expander the axial spacing of surfaces R2 and R3 would need to be set to 39.1.

Example II thus illustrates that a beam expander in accordance with the invention need not necessarily be exactly afocal, for example if the system in which it is used requires some departure from precise afocality. It will be understood that such an expander can still be substantially athermalised with respect to afocality (i.e. with respect to focus of which afocality is a particular condition). Example II also illustrates that a beam expander in accordance with the invention need not necessarily be self-balanced for aberration but may have residual aberration, for example to balance aberration from the rest of the system containing the beam expander. It will thus be understood that the terms $K_T, \Delta K_{CHR}$ and $\Delta K_{TH}$ may not all be actually zero.

It will be appreciated that the above embodiments and examples are given by way of illustration and further embodiments and examples can be devised by those skilled in the art, possibly using different shapes for the negative and/or positive lens element and/or a different selection of two materials.

Examples of possible further infra-red transmitting materials with relevant data expressed on the same basis as above are as follows:

| Material | 'n' | 'V' | dn/dT(°C.$^{-1}$) |
|---|---|---|---|
| ZnS | 2.2002 | 22.7 | 0.00005 |
| BS1 | 2.4914 | 119.3 | 0.00007 |
| AMTIR 1 | 2.4976 | 115.0 | 0.00008 |
| TI20 | 2.4919 | 144.0 | 0.00008 |
| TI1173 | 2.6001 | 142.0 | 0.000079 |
| CsBr | 1.66251 | 176.0 | −0.000079 |
| CsI | 1.73916 | 316.0 | −0.000085 |

-continued

| Material | 'n' | 'V' | dn/dT(°C.$^{-1}$) |
| --- | --- | --- | --- |
| KRS 5 | 2.3722 | 259.8 | −0.0000235 |
| KI | 1.62023 | 137.0 | −0.00005 |

Although the medium separating the lens elements is conveniently air some other gas could be employed if desired, and although surfaces of spherical curvature are generally preferable for ease of manufacture one or more aspheric surfaces could be provided if required. Further, as previously indicated a polychromatic beam expander athermalised for afocality can be provided if relationship (B) above is satisfied in addition to relationship (A).

It will be appreciated that a beam expander with spaced negative and positive lens components constituted by single lens elements is a very simple and convenient arrangement which can be substantially athermalised with respect to afocality, i.e. substantially to maintain the afocal or nearly afocal focus condition despite temperature changes, as described above. It will be understood, however, that such arrangement with two single elements only cannot also be athermalised to maintain magnification, i.e. to effect the same magnification despite changes in temperature. To achieve this it would generally be necessary to athermalise each of the negative and positive components separately and independently so that each by itself satisfies the three previously mentioned conditions. This would normally require the provision of elements of at least three different materials in each component with the consequential complexity and expense. However, it will also be understood that change of magnification with temperature can to some extent be alleviated by having more than one lens element in one or both of the negative and positive components whilst still applying the principle described above of employing different materials having respective refractive index changes with respect to temperature such that the effect of temperature change on the negative component is at least partially compensated by the effect of temperature change on the positive component so as substantially to athermalise the beam expander with respect to afocality.

A group of at least two lens elements constituting a component means, of course, that the power or focal length of that component is determined by further optical considerations but the principle of effectively balancing the effect of temperature change on one component against the effect on the other component to maintain substantial afocality can still apply. Therefore, although single element components may generally be preferable for their simplicity, a substantially afocal beam expander according to the invention could have a negative and/or a positive component constituted by at least two lens elements, which in the one component may be of the same or of different materials and may be separate or cemented together.

It will further be appreciated that, although particularly beneficial for infra-red wavelengths, and especially about 10 microns wavelength where transmissive materials tend to have relatively high variations of refractive index with temperature changes, substantial afocal beam expanders in accordance with the invention could be designed for operation at other wavelengths, including visible wavelengths, by appropriate choice of materials transmissive to the respective operative wavelengths, i.e. having a useful spectral bandpass at the wavelength or wavelengths concerned.

I claim:

1. An optical substantially afocal infra-red radiation beam expander comprising spaced negative and positive lens components employing different infra-red radiation transmitting materials having different respective refractive index changes with respect to temperature chosen such that the refractive index change due to a temperature change in one component is at least partially compensated by the refractive index change due to the temperature change in the other component whereby the infra-red radiation beam expander is substantially athermalised with respect to afocality.

2. An optical substantially afocal infra-red radiation beam expander comprising a lens element of negative power of a first infra-red radiation transmitting material spaced from a lens element of positive power of a second infra-red radiation transmitting material different from the first, wherein the respective coefficients of refractive index change with respect to temperature of the first and second materials are related in a manner substantially to athermalised the infra-red radiation beam expander with respect to afocality.

3. An infra-red radiation beam expander according to claim 2 in which the magnification and the refractive index coefficients of the two materials substantially satisfy (at a design temperature) the relationship:

$$\frac{(y2)}{(y1)} = \frac{\frac{(dn)}{(dT)1}}{\frac{(dn)}{(dT)2}} \cdot \frac{(n2-1)}{(n1-1)}$$

where
(y2)/(y1) is the magnification at the design temperature,
(dn)/(dT)1 is the rate of change of refractive index with respect to temperature of said first material,
(dn)/(dT)2 is the rate of change of refractive index with respect to temperature of said second material.

4. An infra-red radiation beam expander according to claim 3 in which the magnification and the constringences of the two materials additionally substantially satisfy (at the design temperature) the relationship:

(y2)/(y1)=V2/V1 where
V1 is the constringence of said first material,
V2 is the constringence of said second material.

5. An infra-red radiation beam expander according to claim 2 in which said lens element of negative power is a back element of meniscus shape convex to the rear.

6. An infra-red radiation beam expander according to claim 5 in which said lens element of positive power is a front element of meniscus shape convex to the front.

7. An infra-red radiation beam expander according to claim 5 in which said lens element of positive power is a front element of meniscus shape convex to the rear.

8. An infra-red radiation beam expander according to claim 2 for operation with thermal infra-red radiation of about 10 microns wavelength in which said first and second materials are germanium and zinc selenide respectively.

9. An infra-red radiation beam expander according to claim 8 in which said lens element of negative power has refracting surfaces R1 and R2 and said lens element of positive power has refracting surfaces R3 and R4 having radii of curvature and axial separations substantially as follows:

| Surface | Radius of Curvature | Axial Separation |
|---------|---------------------|------------------|
| R1      | 80.828              |                  |
|         |                     | 3.81             |
| R2      | 40.319              |                  |
|         |                     | 90.17            |
| R3      | −201.739            |                  |
|         |                     | 7.62             |
| R4      | −95.476             |                  |

10. An infra-red radiation beam expander according to claim 8 in which said lens element of negative power has refracting surfaces R1 and R2 and said lens element of positive power has refracting surfaces R3 and R4 having radii of curvature and axial separations substantially as follows:

| Surface | Radius of Curvature | Axial Separation |
|---------|---------------------|------------------|
| R1      | −330.342            |                  |
|         |                     | 3.750            |
| R2      | −75.958             |                  |
|         |                     | 36.831           |
| R3      | −34.480             |                  |
|         |                     | 2.000            |
| R4      | −58.209             |                  |

11. A method of manufacturing an optical substantially afocal infra-red radiation beam expander comprising the steps of:

selecting a lens component of a first infra-red radiation transmitting material and having negative power;

selecting a lens component of a second, different infra-red radiation transmitting material and having positive power; and assembling said components in a spaced apart configuration;

the selection of the materials being performed according to the respective change of refractive index of each material with respect to temperature whereby the effect of a temperature change on one component is at least partially compensated by the effect of said temperature change on the other component with respect to afocality.

12. An optical substantially afocal infra-red radiation beam expander comprising spaced negative and positive lens components employing different infra-red radiation transmitting materials having different respective coefficients of refractive index change with respect to temperature wherein the power of each of said positive and negative lens components is chosen such that the changes in the powers of said components due to their respective index changes due to a temperature change compensate for each other to substantially athermalised the infra-red radiation beam expander with respect to afocality.

13. An optical substantially afocal infra-red radiation beam expander comprising a lens element of negative power of a first infra-red radiation transmitting material spaced from a lens element of positive power of a second infra-red radiation transmitting material having a coefficient of refractive index change different from that of said first material, the magnification of the beam expander being chosen such that the infra-red radiation beam expander is substantially athermalised with respect to afocality.

* * * * *